United States Patent [19]

Young

[11] 4,072,327

[45] Feb. 7, 1978

[54] SLIP JOINT BETWEEN A GAS TURBINE ENGINE AND A HEAT EXCHANGER

[75] Inventor: D. Craig Young, Peoria, Ill.

[73] Assignee: Caterpillar Tractor Co., Peoria, Ill.

[21] Appl. No.: 728,589

[22] Filed: Oct. 1, 1976

[51] Int. Cl.² ............................................. F16L 39/04
[52] U.S. Cl. ................................ 285/137 R; 60/39.32; 285/187; 285/364
[58] Field of Search ...................... 60/39.32, 39.51 H; 285/364, 406, 224, 187, 137 R

[56] References Cited

U.S. PATENT DOCUMENTS

| | | | |
|---|---|---|---|
| 2,627,430 | 2/1953 | Koffler | 285/406 |
| 2,679,136 | 5/1954 | Gaubatz | 60/39.32 |
| 2,706,649 | 4/1955 | Foushee, Jr. | 285/187 X |
| 3,244,424 | 4/1966 | Cope | 285/364 X |
| 3,721,089 | 3/1973 | Morrison et al. | 60/39.32 |
| 3,759,323 | 9/1973 | Dawson et al. | 165/166 |
| 3,856,334 | 12/1974 | Lange | 285/137 R |
| 3,902,853 | 9/1975 | Marsee et al. | 60/322 X |

Primary Examiner—Thomas F. Callaghan
Attorney, Agent, or Firm—Phillips, Moore, Weissenberger, Lempio & Majestic

[57] ABSTRACT

A slip joint interconnects the exhaust gas duct of a gas turbine engine to the hot gas inlet duct of an associated heat exchanger by a flange clamping arrangement. The joint allows translational motion of the heat exchanger in the fore and aft axis relative the engine resulting from thermal expansion in the heat exchanger. In addition, a limited amount of misalignment between the engine exhaust gas duct and the heat exchanger hot gas inlet duct is permitted. The easily assembled simple flange clamping arrangement allows a low clamping pressure and thus a low resistance to slip between the two elements.

6 Claims, 8 Drawing Figures

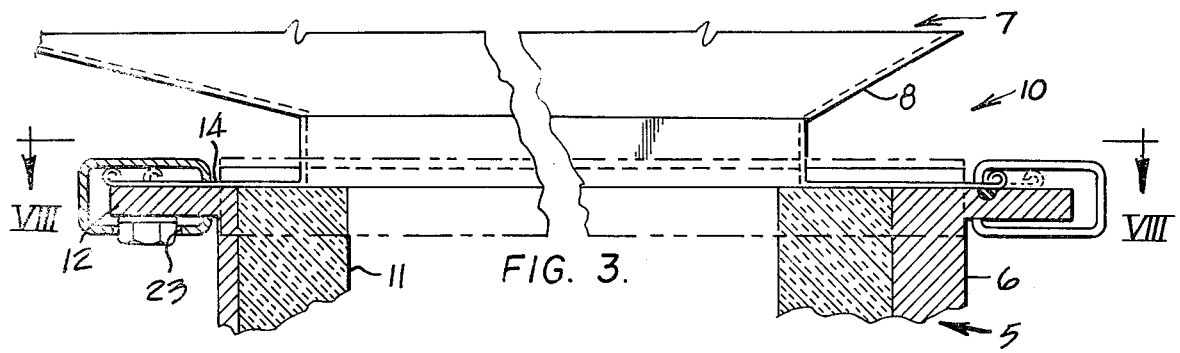

SLIP JOINT BETWEEN A GAS TURBINE ENGINE AND A HEAT EXCHANGER

BACKGROUND OF THE INVENTION

This invention relates to a slip joint for mounting a heat exchanger relative to a gas turbine. In particular, it relates to a slip joint between the exhaust gas manifold and the hot air inlet duct of an associated heat exchanger.

The use of gas turbine engines in stationary power applications and in ground moving vehicles where the power/weight factor is not critical permits the inclusion of a heat exchanger for heating incoming air with the heat of the engine exhaust gasses. Since gas turbine engines operate most efficiently at higher temperatures, preheating the intake air prior to injecting fuel results in a higher output efficiency per pound of fuel burned. Therefore, with the inherent characteristic of high exhaust gas temperatures in gas turbine engines, it has become common, when weight is not a critical factor, to add a heat exchanger to extract excessive heat from turbine exhaust gasses and heat the inlet gasses of the engine. To increase efficiency even further, it is normal procedure to heat the inlet gasses subsequent to compression thereof. Thus, the inlet gasses are ducted from the compressor section of the engine casing through a heat exchanger and then returned to the engine in the vicinity of the engine combustor through a second duct. A third duct interconnects the exhaust manifold of the engine to the heat exchanger. An example of the heat exchanger contemplated for use in this type of engine is described in U.S. Pat. No. 3,759,323.

The material used for construction of the heat exchanger and the material used for construction of the engine generally will have different thermal expansion characteristics. Accordingly, one of the problems in designing a heat exchanger for a gas turbine engine and an associated mounting system therefor, is to overcome the problems inherent in different thermal expansion rates for the two components. In order to increase efficiency in the system, it has been found appropriate to mount the heat exchanger immediately adjacent to the engine, generally above the engine. A typical mounting for heat exchanger adjacent the engine is disclosed in copending application, Ser. No. 728,669, assigned to the assignee of this invention. The mounting means disclosed therein has proved satisfactory for use in higher horsepower engines wherein thermal expansion problems increase, particularly in relation to the interconnecting manifolds between the heat exchanger and the engine. In the structure disclosed in the above-mentioned mounting means, translatory movement between the heat exchanger and the engine generally occurs at two of the three manifolds, either laterally or vertically relative to the engine. The third manifold, generally the center or engine intake manifold, is adapted to allow rotational movement only; therefore, motion in the other two manifolds is generally in opposite directions as the temperature increases or decreases. The aforesaid U.S. patent application, Ser. No. 728,669, adequately provides for a flexible cool air inlet duct and a rotatable hot air outlet duct from the heat exchanger for the air provided from the engine compressor. The exhaust gas duct communicating hot exhaust gasses from the engine to the heat exchanger provides special problems. In addition to a requirement for a seal in the joint, the varying thermal expansion mentioned previously must also be allowed for. The thermal expansion occurring in this joint utilizing the aforedescribed mounting scheme results in translatory motion of the heat exchanger relative the engine, thus too tight a clamp defeats the purpose of the joint while too loose a clamp allows for loss of exhaust gasses through the joint itself.

SUMMARY OF THE INVENTION

Accordingly, it is the object of this invention to provide a joint clamping means in a gas turbine engine to interconnect an exhaust gas manifold of the gas turbine engine with an exhaust gas inlet manifold of an associated heat exchanger.

It is a further object of this invention to provide a joint which fulfills the above requirement while allowing for a limited amount of translational movement between the engine and the heat exchanger.

It is still another object of this invention to provide a joint which requires low clamping pressures resulting in low resistance to slip.

It is still a further object of this invention to provide the aforesaid clamp in a form which is easily manufactured.

It is still another object of this invention to provide the aforesaid clamp structured so that the difficulty of assembly is minimized.

It is still a further object of the invention to provide a clamp which may be used in the ducting of high temperature low pressure gas flows.

Broadly stated, the invention is an assembly having first and second bodies, the first body having a hot gas discharge manifold, the second body having a hot gas inlet manifold. The first and second bodies are affixed one to the other at a point remote of the aforesaid manifolds and each of the first and second bodies may have differing thermal expansions. The invention is a slip joint for connecting the hot gas discharge manifold of the first body to the hot gas inlet manifold of the second body. The slip joint comprises clamp means fixed relative the first body allowing limited translational movement of the second body relative to the first body while sealingly allowing the hot gas discharge manifold to communicate gasses discharged from the first body to the second body through the hot gas inlet manifold under varying temperatures.

These and other objects of the invention will become apparent from a study of the following description and accompanying drawings.

BRIEF DESCRIPTION OF THE DRAWINGS

In the following drawings:

FIG. 3 is a side elevation view in section of the slip joint interconnecting the exhaust gas manifold of a gas turbine engine to the hot gas inlet manifold of a heat exchanger.

FIG. 4 is a detailed sectional view of a portion of the manifold shown in FIG. 8 at line IV—IV;

FIG. 5 is a detailed sectional view of a portion of the manifold shown at FIG. 8 at V—V;

FIG. 6 is a detailed sectional view of a portion of the manifold shown in FIG. 8 at VI—VI;

FIG. 7 is a sectional view of a portion of the manifold shown at VII—VII of FIG. 8;

FIG. 8 is a plan view partly in section of the manifold taken at VIII—VIII of FIG. 3.

DETAILED DESCRIPTION

Figure 1:
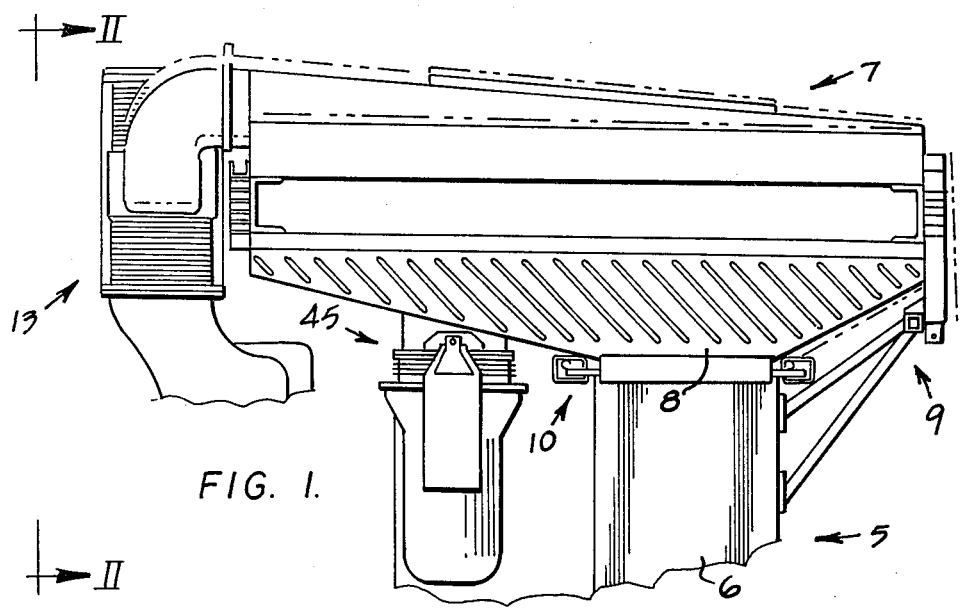
FIG. 1 is an elevation view of a gas turbine engine and a heat exchanger incorporating the slip joint of this invention.
Figure 2:
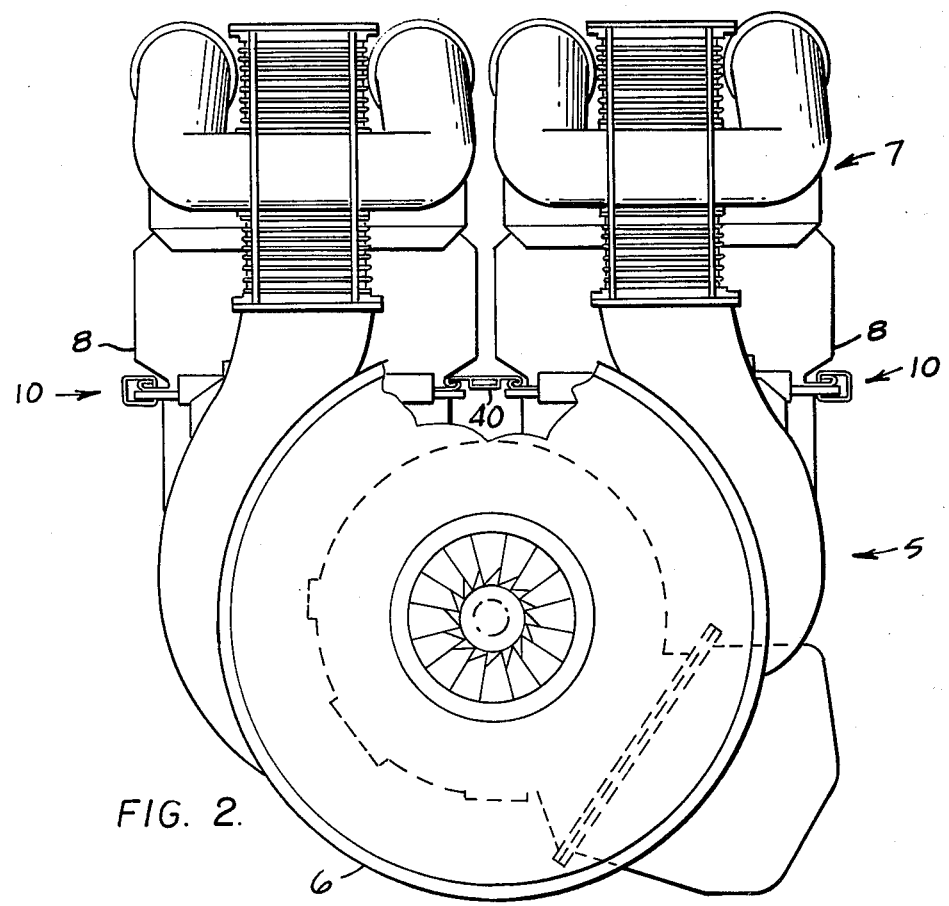
FIG. 2 is a front elevation view of the gas turbine engine illustrated in FIG. 1 with a pair of heat exchangers mounted thereupon in which the hot gas inlet manifolds of the heat exchangers are interconnected with the engine by use of the clamps described herein.

A slip joint and clamp arrangement for ducts interconnecting two bodies such as a first body 5 to a second body 7 so that the second body 7 may move relative the first body as a result of differing thermal expansions between the first and second bodies without blocking the interconnecting ducts is shown in FIG. 3. A particular application of the clamp arrangement shown in FIG. 3 is illustrated in FIGS. 1 and 2 wherein the first body 5 is gas turbine engine 6 while the second body 7 is heat exchanger 8 associated with the gas turbine engine. As can be seen in FIG. 2, two heat exchangers may be associated with a single gas turbine engine. Each heat exchanger is mounted immediately adjacent the engine by a cantilevered bracket 9, a slip joint 10, a trunnion mounting 45, and a bellows connection 13. This mounting arrangement allows vertical translatory motion in the bellows mounting and horizontal translatory motion in the slip joint. The bracket 9 and the trunnion mounting 45 serve to control these two motions. The mounting, which is generally disclosed in copending application, Ser. No. 728,669, provides for a first manifold in bellows mounting 13 to duct cool compressed air from engine 6 to heat exchanber 8, and a second manifold in the trunnion mounting to duct heated compressed air from the heat exchanger to the engine. Slip joint 10 connects the ducts for communicating the hot engine exhaust gasses to the heat exchanger.

The slip joint 10 which is applicable to any hot gas duct is here utilized to connect the exhaust gas manifold of gas turbine engine 6 to heat exchanger 8 and is best understood by reference to FIGS. 3 through 8. The exhaust gas manifold 11 of gas turbine engine 6 is formed in a rectangular shape as shown in FIG. 8 with a flange 12 formed around the perimeter. Similarly, the heat exchanger 8 is formed with a corresponding flange 14 surrounding a rectangular opening in the heat exchanger itself and forming a hot gas-inlet manifold 15 for the heat exchanger. Exhaust gas flange 12 and heat exchanger flange 14 are each formed with a flat surface so that the exhaust gas flange and the heat exchanger flange may be placed in face-to-face abutting relation, as shown in FIG. 3.

In order to retain the exhaust gas flange 12 and the heat exchanger flange 14 in an abutting relation, while allowing a certain degree of translatory motion of heat exchanger flange relative the exhaust gas flange and permitting some duct misalignment, a plurality of C-shaped clamp members 16 are utilized. Each clamp member 16 is formed with an open side 18, opposing base sides 19 and 20 and a closed side 21 opposite the open side. Each C-shaped clamp 16 is generally rectilinear in shape and has a lengthwise dimension sufficiently long to retain the two flanges in abutting relation, as will be described below. In particular, with heat exchanger flange 14 positioned in abutting relationship with the exhaust gas flange 12 so that the exhaust gas manifold is generally aligned with the hot gas inlet manifold of the heat exchanger, at least three C-shaped clamps 16 are positioned, as illustrated in FIG. 4, with open end 18 overlapping the two flanges.

Each clamp 16 defines a plurality of spaced apart bores 23, while exhaust gas flange 12 defines a similar plurality of threaded bores 25 adapted to receive a bolt means. The bolt means, such as bolt 27, and a washer or a spacer 28 may be passed through bore 23 while clamp member 16 is positioned with bore 23 aligned with threaded bore 25, so that with bolt 27 threadably received in threaded bore 25, clamp member 16 is retained in a specific predetermined relationship with flange 12 by each bolt 27 extending outwardly through a corresponding bore 23. Heat exchanger flange 14 is formed with a rolled over end 30 such as shown in FIGS. 4 or 5 or a folded over end 32, as shown in FIGS. 6 and 7, to retain the hot gas inlet manifold of heat exchanger 8 in general alignment with the exhaust gas manifold of the gas turbine engine while the plurality of clamp members 16 are installed.

To provide a gas tight connection between the exhaust gas flange 12 and heat exchanger flange 14, a groove 34 is formed in the upper surface of exhaust gas flange 12, which is the surface in abutting relationship with heat exchanger flange 14. A seal or packing element 36, which may be compressible, is placed in groove 34 so that with the heat exchanger flange 14 in abutting relationship with the exhaust gas flange 12 of gas turbine engine 6, the packing element 36 is compressed to form a relatively gas tight seal between the two bodies. In addition to bolt 27 holding the clamp member 16 in a particular relationship with the exhaust gas flange 12, the open side 18 of each clamp member 16 is formed with a specific dimension less than the combined thickness formed by exhaust gas flange 12 and heat exchanger flange 14 when in abutting relation. Choice of this dimension is to provide a degree of clamping between the two flanges, yet the dimension is chosen sufficent to allow heat exchanger flange 14 to slip relative exhaust gas flange 12.

The rectangular shape of the exhaust gas manifold of the gas turbine engine used in this particular application requires a minimum of four of the clamp members 16 in the event there is a single exhaust gas manifold leading from the engine 6 to the heat exchanger 8. As can be seen in the configuration in FIG. 2, two heat exchangers are mounted side by side above a gas turbine engine. Accordingly, a special clamp member 40 is provided for use between the two adjacently mounted heat exchangers. Special clamp member 40 is generally of a T-shape cross-section having a broad leg 42 affixed to a cross member 43. Broad leg 42 is formed of sheet metal in a U-shape so that the upright portions of the U are affixed to cross member 43 with the flat base providing a flattened surface to abut the gas turbine engine of first body 5. The extreme ends of cross member 43 are folded under and up to form a clamping portion which may be simultaneously engaged with the folded over ends 32 of the heat exchanger flanges 14. Special clamp member 40 may be formed with a plurality of bores (not shown) through which fastening means appropriate to the art may be utilized to affix the special clamp member 40 to the gas turbine engine.

It should be apparent that in all cases the clamp members are affixed to the first body allowing the second body to move longitudinally relative the first body. Although this choice has proved appropriate in a gas turbine engine it would be equally appropriate to fix the clamp member to the second body allowing the second body and the clamp member to move relative the first body. Specifically, in the embodiment discussed herein the longitudinal motion envisioned as a result of thermal expansion of the heat exchanger 8 shown in FIG. 3 is from left to right. Accordingly, the heat exchanger 8 is positioned so that the extreme left end of flange 14 generally is in alignment with the extreme left end of exhaust gas flange 12 as seen in FIG. 3. This corresponds to the forward end of the exhaust gas manifold, as shown in FIG. 1. The nature and mounting of the heat exchanger 8 envisioned in this application is such that the greatest movement due to expansion is in a leftward direction as seen in FIG. 3, with the position of the heat exchanger flange 14 when heated shown in phantom in FIGS. 3, 4 and 5. The motion depicted in FIGS. 3, 4 and 5 is primarily that occurring from expansion of the complete heat exchanger relative the fixed trunnion mounting 45 located forward of the exhaust gas manifold. Lateral expansion also occurs and is apparent in FIG. 7 which illustrates the relation of the exhaust gas flange and the heat exchanger flange along an axis parallel to the engine as seen in FIG. 1. The expansion of each heat exchanger flange, shown in FIG. 7, in phantom, is toward the broad leg member 42 of the clamp. Similar expansion would occur in FIG. 6 in a leftward direction that is toward the closed side of the clamp member 16 as illustrated.

Although operation of this slip joint should be apparent, the following additional comments are offered in clarification. The clamp members 16 are slidably installed over abutting flanges such as exhaust gas flange 12 and heat exchanger flange 14 followed by insertion of the plurality of bolts 27 and spacers 28 in the plurality of bores 23 and the threaded bores 25. With the clamp members 16 in place and if a use of the special clamp member 40 is appropriate with a special clamp member 40 in place, thermal expansion of the first body 5 and the second body 7 may take place at differing rates so that the second body 7 moves relative the first body 5 as illustrated by the phantom lines in FIG. 3 while retaining the two flanges in a sealing relation.

Although this particular invention has been directed specifically toward the sealing of a hot gas exhaust manifold of the gas turbine engine to a heat exchanger, it is to be understood that a similar type slip joint may be utilized in other gas duct applications. It is also to be understood that the particular application herein described was directed toward a rectangular duct. The principles of the clamp herein described are equally applicable to other snaped ducts.

What is claimed is:

1. In an assembly having first and second bodies, the first body including a rectangular-shaped hot gas discharge manifold defining a first flange thereabout having a flat surface, the second body including a rectangular-shaped hot gas inlet manifold defining a second flange thereabout having a flat surface, the first and second bodies affixed one to the other at a point remote of said manifolds and with said flat surfaces in an abutting relation, and said first and second bodies having different thermal expansion rates, a slip joint for connecting the hot gas discharge manifold of the first body to the hot gas inlet manifold of the second body, the slip joint comprising:

clamp means fixed relative the first body allowing limited translational movement of second body relative the first body while sealingly allowing the hot gas discharge manifold to communicate gases from the first body to the second body through the hot gas inlet manifold under varying temperature conditions;

the clamp means comprising a plurality of generally rectilinear C-shaped members, each having an open side, opposing base sides, and a closed side opposite the open side, and wherein each C-shaped member may be disposed with the open side thereof in a clamping relationship with the first and second flanges, while said first and second flanges are in an abutting relation;

said first flange defining a plurality of spaced-apart threaded bores;

a base side of each C-shaped member defining a plurality of holes each alignable with the spaced-apart threaded bores of the first flange, and each hole of larger diameter than the threaded bore;

the assembly further comprising bolt means threadably disposable in said bore and extending outwardly therefrom through said aligned holes so that said C-shaped member is retained in a clamping relation with the first and second flanges.

2. The combination set forth in claim 1 wherein the second flange defines at least one rolled over end, said rolled over end extending upwardly of said flange interior of one of the C-shaped clamps.

3. The combination set forth in claim 2 wherein the second flange defines at least one folded over end on a different end of said flange than said rolled over end, said folded over end extending upwardly of said flange interior of a second C-shaped clamp.

4. The combination set forth in claim 3 wherein the first flange defines a groove in the flat surface thereof, said groove extending peripherally thereabout, the assembly further comprising seal means disposed in said groove for sealingly associating the second flange with the first flange.

5. The combination set forth in claim 1 wherein the first body defines a second hot gas discharge manifold adjacent to the first hot gas discharge manifold and wherein the assembly further comprises a third body affixed to said first body at a point remote of said second hot gas discharge manifold, said third body having a hot gas inlet manifold in general alignment with said second hot gas discharge manifold, said second and third bodies mounted adjacent one another, each having similar thermal expansion properties, and further wherein the clamp means further comprises a generally T-shaped clamp disposed in a clamping relation along the adjacent sides of said second and third bodies relative said first body.

6. In an assembly having first, second and third bodies, the first body including first and second hot gas discharge manifolds arranged in an adjacent relation, said second and third bodies each having a hot gas inlet manifold, said second and third bodies mounted adjacent one another and each affixed to said first body at points remote of said hot gas discharge manifolds with said hot gas inlet manifolds in general alignment with said first and second hot gas discharge manifolds, respectively, said second and third bodies each having similar thermal expansion properties, said similar thermal expansion properties differing from the thermal expansion properties of said first body, a slip joint for connecting said first and second hot gas discharge manifolds on said first body to said first and second hot gas inlet manifolds of said second and third bodies, respectively, the slip joint comprising:

clamp means fixed relative said first body allowing independent limited translational movement of said second and third bodies relative said first body while sealingly allowing said hot gas discharge manifold to communicate gases from said first body to said second and third bodies through said hot gas inlet manifolds under varying temperature conditions, said clamp means comprising a generally T-shaped clamp disposed in a clamping relation along the adjacent sides of said second and third bodies relative said first body.

* * * * *